United States Patent
Tsuchiya et al.

(10) Patent No.: US 9,562,461 B2
(45) Date of Patent: Feb. 7, 2017

(54) EXHAUST GAS CONTROL SYSTEM OF INTERNAL COMBUSTION ENGINE

(71) Applicants: Tomihisa Tsuchiya, Toyota (JP); Sakutaro Hoshi, Kariya (JP)

(72) Inventors: Tomihisa Tsuchiya, Toyota (JP); Sakutaro Hoshi, Kariya (JP)

(73) Assignees: TOYOTA JIDOSHA KABUSHIKI KAISHA, Toyota-shi (JP); KABUSHIKI KAISHA TOYOTA JIDOSHOKKI, Kariya-shi (JP)

(*) Notice: Subject to any disclaimer, the term of this patent is extended or adjusted under 35 U.S.C. 154(b) by 0 days.

(21) Appl. No.: 14/772,609

(22) PCT Filed: Mar. 4, 2014

(86) PCT No.: PCT/IB2014/000237
§ 371 (c)(1),
(2) Date: Sep. 3, 2015

(87) PCT Pub. No.: WO2014/135951
PCT Pub. Date: Sep. 12, 2014

(65) Prior Publication Data
US 2016/0003120 A1    Jan. 7, 2016

(30) Foreign Application Priority Data
Mar. 7, 2013  (JP) ................................ 2013-045520

(51) Int. Cl.
*F01N 3/20*  (2006.01)
*F01N 11/00*  (2006.01)

(52) U.S. Cl.
CPC ............... *F01N 3/208* (2013.01); *F01N 3/206* (2013.01); *F01N 3/2006* (2013.01);
(Continued)

(58) Field of Classification Search
CPC ...... F02D 41/029; F01N 9/002; F01N 3/0842; F01N 13/02; F01N 3/035
(Continued)

(56) References Cited

U.S. PATENT DOCUMENTS

| | | |
|---|---|---|
| 6,363,771 B1 | 4/2002 | Liang et al. |
| 2004/0040288 A1 | 3/2004 | Jacob et al. |

(Continued)

FOREIGN PATENT DOCUMENTS

| | | | |
|---|---|---|---|
| DE | 102011104299 A1 * | 12/2012 | ............. F01N 3/208 |
| EP | 1 338 562 | 8/2003 | |

(Continued)

OTHER PUBLICATIONS

International Search Report issued May 27, 2014, in PCT/IB2014/000237 Filed Mar. 4, 2014.

*Primary Examiner* — Patrick Maines
(74) *Attorney, Agent, or Firm* — Oblon, McClelland, Maier & Neustadt, L.L.P.

(57) ABSTRACT

An exhaust gas control system of an internal combustion engine includes a urea water tank, a heater, a purifying device, a notification device, and a controller. The controller is configured to determine whether frozen urea water is left or not. The controller is configured to determine whether liquid urea water capable of being pumped out is not left or not. The controller is configured to estimate a suppliable amount of the urea water to the urea water tank in response to a state where the frozen urea water is left, and the controller configured to control the notification device so as to give a notification for prompting a supply of the suppliable amount of the urea water to the urea water tank in response to a state where liquid urea water capable of being pumped out is not left.

7 Claims, 5 Drawing Sheets

(52) U.S. Cl.
CPC ............ *F01N 3/2066* (2013.01); *F01N 11/00* (2013.01); *F01N 11/002* (2013.01); *F01N 2550/05* (2013.01); *F01N 2610/02* (2013.01); *F01N 2610/10* (2013.01); *F01N 2610/105* (2013.01); *F01N 2610/1406* (2013.01); *F01N 2610/1486* (2013.01); *F01N 2900/1602* (2013.01); *Y02T 10/24* (2013.01); *Y02T 10/47* (2013.01)

(58) Field of Classification Search
USPC .................. 60/273, 274, 295, 301, 286, 285
See application file for complete search history.

(56) References Cited

U.S. PATENT DOCUMENTS

| | | | | |
|---|---|---|---|---|
| 2005/0207936 A1* | 9/2005 | Berryhill | ............ | B01D 53/9495 |
| | | | | 422/63 |
| 2007/0163245 A1* | 7/2007 | Sheridan | ............... | F01N 3/2066 |
| | | | | 60/286 |
| 2009/0084095 A1* | 4/2009 | Dalton | .................. | F01N 3/2066 |
| | | | | 60/301 |
| 2012/0006003 A1* | 1/2012 | Darr | ........................ | F01N 3/208 |
| | | | | 60/274 |

FOREIGN PATENT DOCUMENTS

| | | | |
|---|---|---|---|
| JP | 2008056316 A | * | 3/2008 |
| JP | 2008 115784 | | 5/2008 |
| JP | 2009-154043 A | | 7/2009 |
| JP | 2010 096126 | | 4/2010 |
| JP | 2013 147982 | | 8/2013 |
| JP | 2013147982 A | * | 8/2013 |
| WO | 01 38704 | | 5/2001 |

\* cited by examiner

EXHAUST GAS CONTROL SYSTEM OF INTERNAL COMBUSTION ENGINE

BACKGROUND OF THE INVENTION

1. Field of the Invention

The present invention pertains to an exhaust gas control system of internal combustion engine for purifying exhaust gas by adding urea water pumped out from a urea water tank to the exhaust gas.

2. Description of Related Art

Urea SCR (Selective Catalytic Reduction) apparatus is known as an exhaust gas control system of internal combustion engine. Urea SCR apparatus is arranged to add urea water to exhaust gas. The urea water is thermally decomposed and hydrolyzed with exhaust gas heat, leading to generation of ammonia. With use of generated ammonia serving as a reduction agent, nitrogen oxide (NOx) in exhaust gas is subjected to reduction reaction on a selective reduction catalyst. This leads to a decomposition of NOx into water and nitrogen. Such a urea SCR apparatus is provided with a urea water tank for storing urea water, and a urea water addition valve for adding urea water pumped out from the urea water tank to the exhaust gas.

Urea water gets freezing at −11° C. or lower. During cold period, urea water in the urea water tank is possibly frozen so as not to be allowed to be supplied to the urea water addition valve. In a urea water SCR apparatus in Japanese Patent Application Publication No. 2008-115784 (JP 2008-115784A), the urea water tank is provided with a heater for melting frozen urea water in the urea water tank by heating with the heater.

When an internal combustion engine is left for a long time while stopping under cold circumstance, urea water in the urea water tank entirely freezes. In this circumstance, the internal combustion engine may start operating. In this instance, after the internal combustion engine starts operating, the heating is initiated with a heater. The urea water is gradually melted from a periphery of the heater, and the melted urea water is pumped out with a pump, and supplied to the urea water addition valve. However, when the urea water is consumed at a speed larger than a melting speed of the heater, the melting urea water is exhausted, not allowing to be added to the exhaust gas. Besides, the urea water is entirely pumped out at the periphery of the heater, leaving a void space between residual frozen urea water and the periphery of the heater within the urea water tank. In this condition, the heat of the heater is hardly transmitted to the frozen urea water, causing delay in restart of the melting of urea water and addition of urea water.

SUMMARY OF THE INVENTION

The present invention has an object to provide an exhaust gas control system of internal combustion engine for preferably suppressing stagnation of urea water addition resulting from freezing.

The exhaust gas control system of an internal combustion engine according to an aspect of the present invention includes: a urea water tank for storing urea water, a heater for melting frozen urea water within the urea water tank, an purifying device configured to purify exhaust gas by addition of urea water pumped from the urea water tank to the exhaust gas of the internal combustion engine, a notification device, and a controller configured to determine whether frozen urea water is left within the urea water tank or not, the controller configured to determine whether liquid urea water capable of being pumped out is not left within the urea water tank or not, the controller configured to estimate a suppliable amount of the urea water to the urea water tank in response to a state where the frozen urea water is left within the urea water tank, and the controller configured to control the notification device so as to give a notification for prompting a supply of the suppliable amount of the urea water to the urea water tank in response to a state where liquid urea water capable of being pumped out is not left within the urea water tank.

The exhaust gas control system of the internal combustion engine according to an aspect of the present invention gives a notification for prompting the supply of urea water in an amount suppliable to the urea water tank in response to a state where frozen urea water is left within the urea water tank and the urea water is not pumped out. According to the notification, it is possible to supply urea water in the urea water tank for adding the supplied urea water in exhaust gas. Besides, heat of the heater is transmitted to the frozen urea water through the medium of the supplied urea water, facilitating melting of the frozen urea water. In this instance, as the frozen urea water is left within the urea water tank, the urea water may overflow from the urea water tank, when the urea water is supplied in the same amount as that supplied at the time when residual amount of the urea water is actually decreased. The exhaust gas control system of internal combustion engine according to an aspect of the present invention makes a notification for prompting the supply of the urea water in a suppliable amount in the presence of residual frozen urea water, making it possible to give a caution for not supplying the urea water too much. Accordingly, it is possible to suppress the stop of the urea water addition resulting from freezing, more preferably.

Such an exhaust gas control system of the internal combustion engine may be arranged to estimate the suppliable amount of urea water in the urea water tank, and notify the information indicating the estimated suppliable amount, in order to instruct the suppliable amount of urea water more precisely.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on an embodiment specifying an exhaust gas control system of internal combustion engine of the present invention with reference to FIG. 1 to FIG. 5. The exhaust gas control system according to this embodiment can be applied to vehicle loaded diesel engine.

Figure 1:
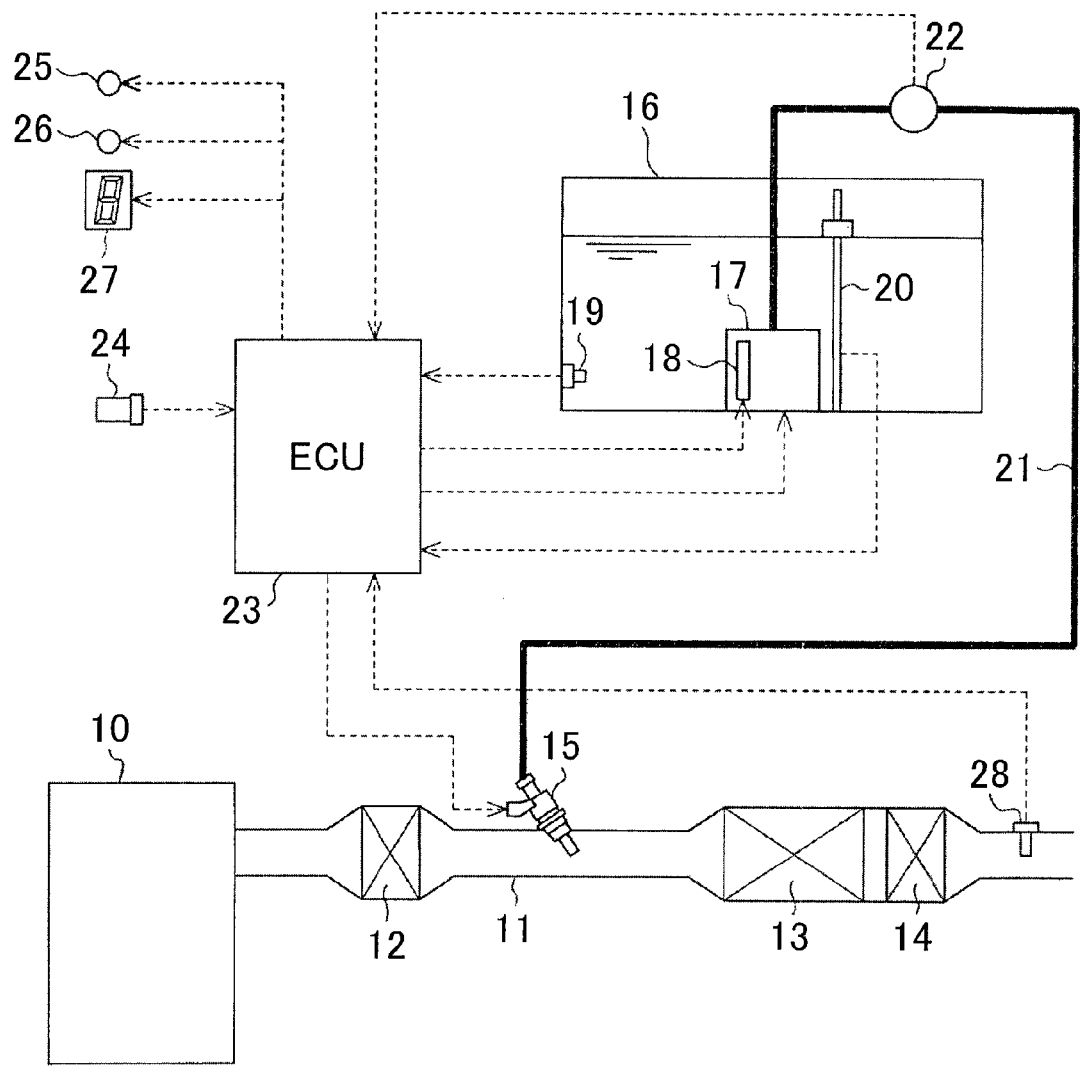
FIG. 1 shows a schematic view which schematically indicates a whole configuration according to an embodiment of an exhaust gas control system of internal combustion engine.

As shown in FIG. 1, in an exhaust gas path 11 of a diesel engine 10, diesel particulate filter (DPF) 12, SCR catalyst unit 13 and oxidation catalyst unit 14 are disposed in this order from main body side of the diesel engine 10. Besides, a urea water addition valve 15 for adding urea water to exhaust gas is disposed between the DPF 12 and the SCR catalyst unit 13 in the exhaust gas path 11. In the downstream of the oxidation catalyst unit 14 in the exhaust gas path 11, an NOx sensor 28 is disposed for detecting NOx level of exhaust gas passing through the oxidation catalyst unit 14.

DPF 12 is formed of a porous ceramics, and serves as a filter collecting PM (particulate substance) in exhaust gas. Platinum noble metal catalyst is supported on the DPF 12 employed in this embodiment, for improvement of rising temperature performance in filter regeneration control. In the filter regeneration control, additional fuel injection in compression process of the diesel engine 10, namely post injection and the like, allows unburnt fuel to be added to exhaust gas inlet into the DPF 12. After the unburnt fuel is added into the DPF 12, HC component of the unburnt fuel is oxidized with noble catalyst. Reaction heat of this oxidation rises internal temperature of the DPF 12. In the filter regeneration control, the rising temperature of the reaction heat allows the internal temperature of the DPF 12 to rise up to an ignition temperature of the PM or more. This procedure enables to ignite the PM collected by DPF 12 and remove the same.

Meanwhile, the SCR catalyst unit 13 is an exhaust gas control unit for purifying NOx in exhaust gas by selective catalyst reduction. SCR catalyst for prompting NOx reduction reaction with ammonia serving as a reduction agent is supported on the cell surface. Ammonia serving as a reduction agent is generated when urea water added to the urea water addition valve 15 is thermally decomposed and hydrolyzed with the heat of exhaust gas. The oxidation catalyst unit 14 disposed at the downstream of the SCR catalyst unit 13 has a role in decomposing and removing ammonia passing through the SCR catalyst unit 13 by oxidation reaction. The SCR catalyst unit 13 is regarded as "a purifying device".

The exhaust gas control system according to this embodiment is provided with a urea water tank 16 for storing urea water to be supplied to the urea water addition valve 15. The urea water tank 16 is provided with a urea water pump 17 for pumping out the urea water stored in its interior. An electrothermic heater 18 is embedded within the urea water pump 17. The urea water tank 16 is provided with a urea water temperature detector 19 for detecting a temperature (described as a urea water temperature Tr, hereinafter,) of the urea water stored in its interior and a level sensor 20 detecting a liquid level of the urea water in the urea water tank 16. The level sensor 20 employed in this embodiment is configured to detect discretely the liquid level of the urea water at plural steps. In the following explanations, the minimum value of liquid level indicated by detection result of the level sensor 20 is described as a level "LO". The water temperature detector 19 is regarded as "a temperature detector".

The urea water pump 17 is connected to the urea water addition valve 15 via a urea water pipe 21. In the urea water pipe 21, a urea water pressure sensor 22 is disposed for detecting a pressure (described as urea water pressure Pr, hereinafter) of the urea water to be supplied to the urea water addition valve 15 from the urea water pump 17.

Meanwhile, an electric control unit (ECU) 23 managing control of the diesel engine 10 is connected to the above-mentioned urea water temperature detector 19, the level sensor 20, the urea water pressure sensor 22, and various sensors provided to each part of a vehicle, such as an external air temperature sensor 24 detecting an external air temperature To of vehicle, via a signal line. Then, the ECU 23 performs drive controls of the urea water addition valve 15 and the urea water pump 17 and an energization control of the heater 18, as a part of the control of the diesel engine 10. The ECU 23 is regarded as "a controller".

Besides, the ECU 23 is connected with a urea water supply indicator 25 provided to an instrument panel of vehicle, an NOx deterioration indicator 26 and a suppliable amount indicator 27. The urea water supply indicator 25 is arranged to light when the supply of urea water into the urea water tank 16 is required. The NOx deterioration indicator 26 is arranged to light when NOx exhaustion is deteriorated by stop of urea water addition. The suppliable amount indicator 27 is arranged to display a suppliable amount of urea water in the urea water tank 16 in numeral and the like. The urea water supply indicator 25 and the suppliable amount indicator 27 are regarded as "a notification device".

The ECU 23 is arranged to light the urea water supply indicator 25 for prompting a driver to perform the supply of urea water when the liquid level of the urea water in the urea water tank 16 is confirmed to be decreased down to level "LO" by detection result of the level sensor 20. Besides, the ECU 23 is arranged to light the NOx deterioration indicator 26 in order to warn the driver about deterioration of NOx level when the deterioration of NOx level of exhaustion gas is detected with the NOx sensor 28.

Besides, the ECU 23 performs similar operation, when the urea water pump 17 vacuums air and is not able to pump out urea water due to decrease of the urea water pressure Pr detected with the urea water pressure sensor 22, namely when air vacuuming of the urea water pump 17 is confirmed. Such an air vacuuming of the urea water pump 17 may be possible, due to poor melting of urea water described hereinafter as well as empty of the urea water in the urea water tank 16.

Figure 2A:
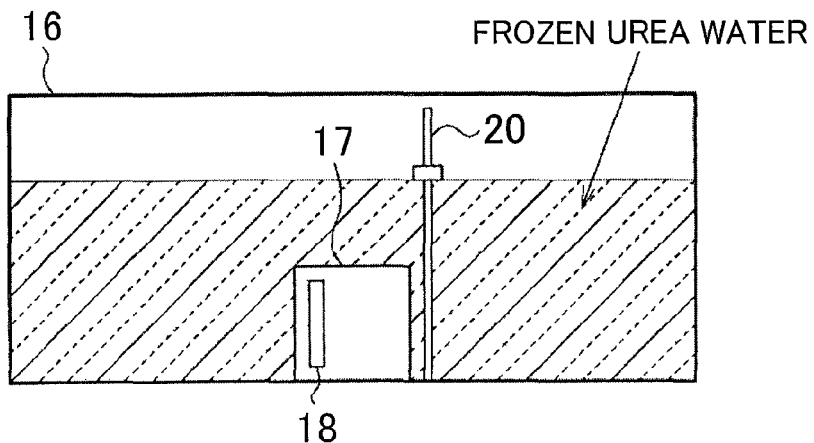
FIG. 2 (a)-(c) shows a schematic view of a process leading to poor melting of the urea water tank according to the same embodiment of the exhaust gas control system.
Figure 2B:
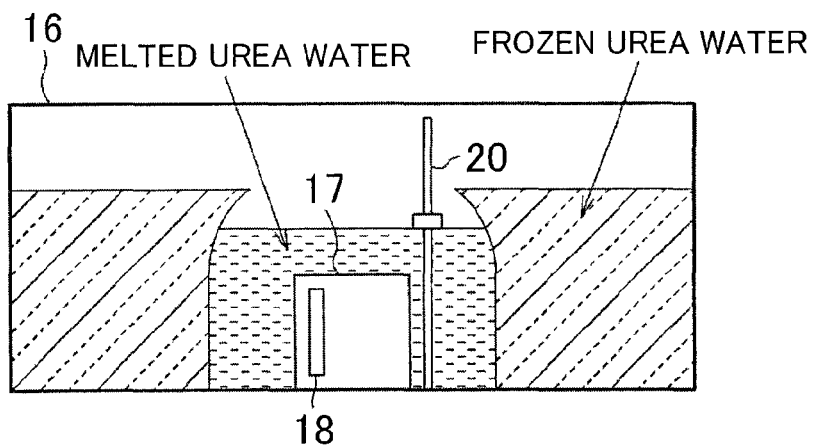
Figure 2C:
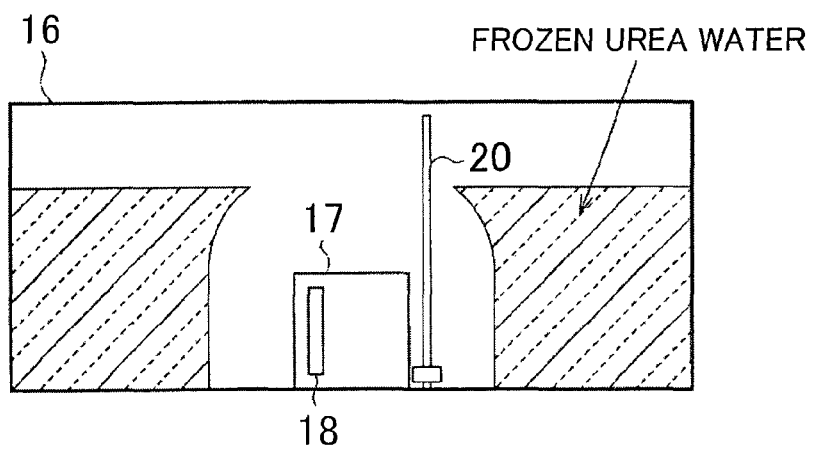

With reference to FIG. 2A, FIG. 2B and FIG. 2C, a progress of such poor melting will be explained. The urea water in the urea water tank 16 is caused to freeze by decrease in its temperature down to its freezing temperature or less. The ECU 23 is arranged to melt the frozen urea water with heat generated by an energization of the heater 18 disposed within the urea water tank 16, when the urea water temperature Tr detected with the urea water temperature detector 19 is decreased to the freezing temperature of urea water or less.

Here, as shown in FIG. 2A, the energization of the heater 18 is initiated when the urea water in the urea water tank 16 is entirely frozen. Then, the urea water starts melting from circumference of the heater 18, as shown in FIG. 2B. The melted urea water is pumped out with the urea water pump 17 to be added to exhaust gas.

Here, when the consumption speed of urea water resulting from the addition to exhaust gas is larger than melting speed, the amount of melted liquid urea water decreases, leaving only frozen urea water within the urea water tank 16, as shown in FIG. 2C. The urea water pump 17 vacuums air also in this condition.

In this condition, melted urea water is pumped out so as to form a void space at a peripheral portion of the heater 18 surrounded by the frozen urea water within the urea water tank 16. As a result, heat of the heater 18 is hardly transmitted to the frozen urea water, causing delay in the melting of the urea water.

Also in this case, urea water is supplied to the urea water tank 16 according to lighting of the urea water supply indicator 25 in response to confirmation of air vacuuming, allowing the void space to be filled with the liquid urea water. Then, the filled liquid urea water serves as a medium for transmitting heat so as to facilitate heat transmission to the frozen urea water from the heater 18. However, in this condition, the frozen urea water is left within the urea water tank 16, thereby only smaller amount of urea water can be filled in the urea water tank 16, compared to the case that the residual amount of urea water is actually decreased. Thereby, in the presence of the residual frozen urea water, when the urea water is supplied similarly to the situation that the residual amount of urea water is actually decreased, the urea water is not able to be entirely filled, possibly overflowing from the urea water tank 16.

In this embodiment, notification is made for prompting supply of urea water in an amount suppliable to the urea water tank 16 in which frozen urea water actually remains, when the frozen urea water remains within the urea water tank 16 while suppliable liquid urea water is not left within the urea water tank 16.

Figure 3:
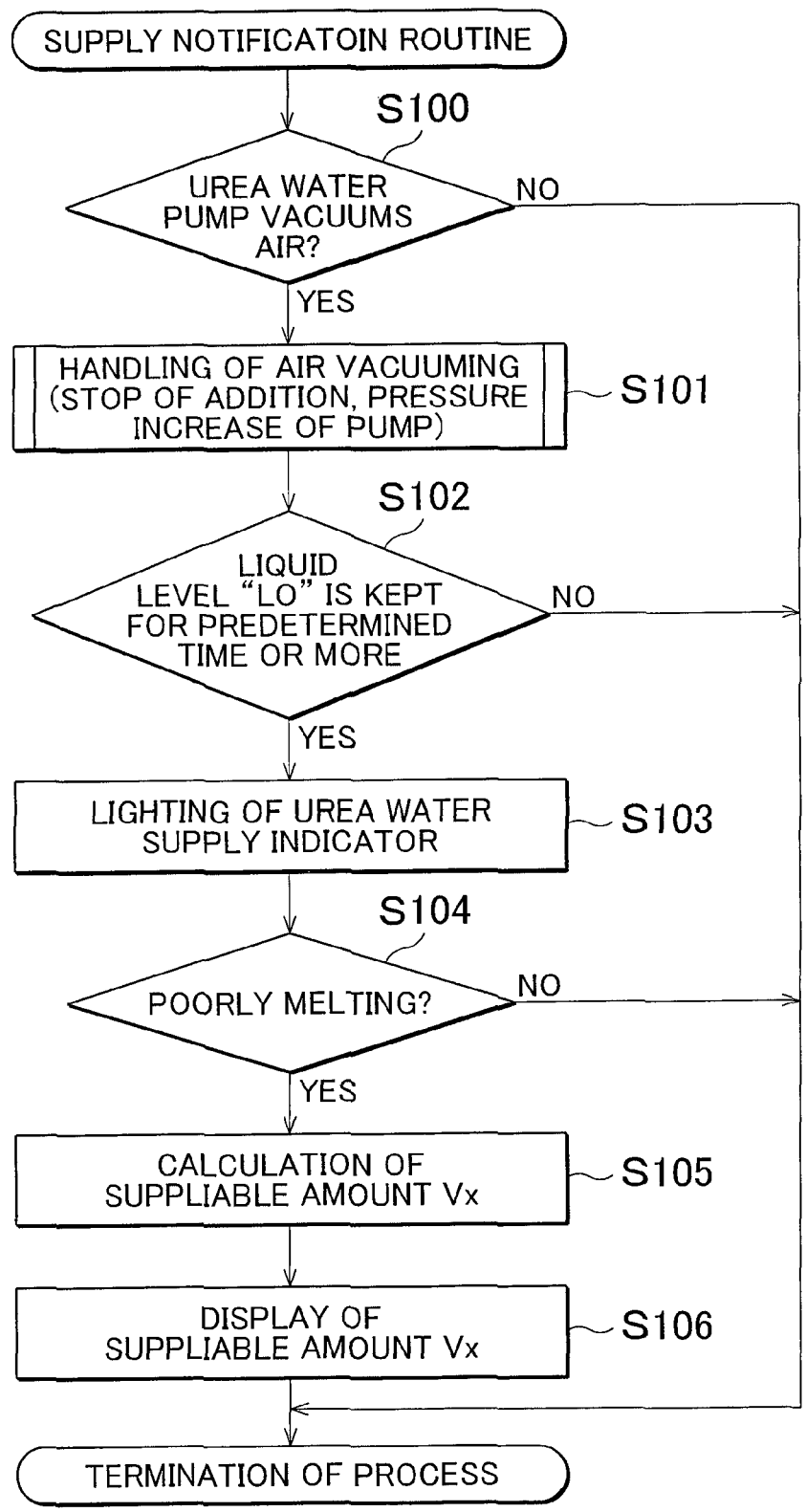
FIG. 3 shows a flowchart indicating a processing procedure of supply notification routine applied to the same embodiment.

FIG. 3 shows a flowchart indicating a processing procedure of supply notification routine applied to the exhaust gas control system according to this embodiment. The routine processing is repetitively implemented with the ECU 23 during each of a predetermined control period.

When the routine processing is initiated, determination is made regarding whether air vacuuming occurs in the urea water pump 17 at step S100. In this embodiment, the determination regarding the presence of air vacuuming is made on the basis of whether the urea water pressure Pr detected with the urea water pressure sensor 22 is kept at a predetermined value or lower for a predetermined time or more.

Here, in the absence of the air vacuuming (S100: NO), the routine processing is terminated. Meanwhile, in the presence of the air vacuuming (S100: YES), the processing is forwarded to step S101.

When the processing is forwarded to step S101, implementation for handling air vacuuming is instructed at step S101. In this embodiment, stop of addition of urea water to exhaust gas and pressure increase control of the urea water pump 17 are implemented as the handling of air vacuuming. The pressure increase control of the urea water pump 17 is performed by increasing a driving electric power of the urea water pump 17, in order to eliminate temporary poor vacuuming of urea water caused by clogging in the pipe. For such a pressure increase control, the urea water pump 17 is intermittently driven to repetitively perform driving for a predetermined time and stop for a predetermined time, in order to prevent heat generation resulting from idling.

Next, in step S102, determination is made regarding whether the resultant liquid level detected with the level sensor 20 is kept at level "LO" for a predetermined period or more. When the resultant liquid level is not kept at level "LO" for the predetermined period or more (NO), the routine processing is terminated. Meanwhile, when the resultant liquid level is kept at level "LO" for the predetermined period or more (YES), the processing is forwarded to step S103. In the step S103, the urea water supply indicator 25 is lighted.

When the urea water supply indicator 25 is lighted, in subsequent step S104, determination is made regarding the presence of poor melting of the frozen urea water within the urea water tank 16, namely regarding whether the air vacuuming of the urea water pump 17 is caused by residual frozen urea water within the urea water tank 16 while suppliable liquid urea water is not left within the urea water tank 16.

In this embodiment, such determination regarding poor melting is made on the basis of whether to satisfy the following requirement (A) as well as at least one of the following requirements (B1) and (B2). (A) The urea water temperature Tr is freezing temperature of the urea water or less. The ECU 23 which determines whether satisfy the requirement (A) is regarded as "a determination device".

(B1) The estimated amount (described as an estimated urea water residual amount Vt, hereinafter) of residual urea water within the urea water tank 16 is sufficiently larger than a value for the level "LO". (B2) The consumption amount of urea water by addition during the time satisfying the above requirement (A) until this moment is sufficiently larger than an estimated value (described as an estimated melted amount Mx, hereinafter) of the amount of urea water melted during this period.

The calculation of the estimated urea water residual amount Vt and the estimated melted amount Mx are described below. In this embodiment, the consumption amount of urea water is obtained by cumulating the product of addition time of urea water for each addition and urea water addition rate (urea water addition amount per unit time) of the urea water addition valve 15, at each addition.

When poor melting is determined to be absent (NO) in the step S104, the routine processing is terminated. Meanwhile, when poor melting is determined to be present (S104: YES) in the step S104, a suppliable amount Vx indicating the amount of suppliable urea water in the urea water tank 16 with frozen urea water being actually left is calculated in step S105. Detailed explanation will be given below regarding calculation of the suppliable amount Vx in this embodiment. After the calculated suppliable amount Vx is displayed in the suppliable amount indicator 27 in step S106, the routine processing is terminated.

According to manual of vehicle applied to this embodiment, supply of urea water in a predetermined amount or more is instructed to perform in case notification of urea water supply is made only by lighting of the urea water supply indicator 25. The urea water amount required for the addition of urea water for driving at a predetermined distance of the vehicle is set as the value of this predetermined amount. This manual describes supply of urea water into the urea water tank 16 in an indicated suppliable amount Vx, when the suppliable amount Vx is indicated in the suppliable amount indicator 27 while the urea water supply indicator 25 is lighted. Accordingly, the ECU 23 which performs step S104 to step S106, the urea water supply indicator 25, and the suppliable amount indicator 27 are regarded as "a notification device".

Figure 4:
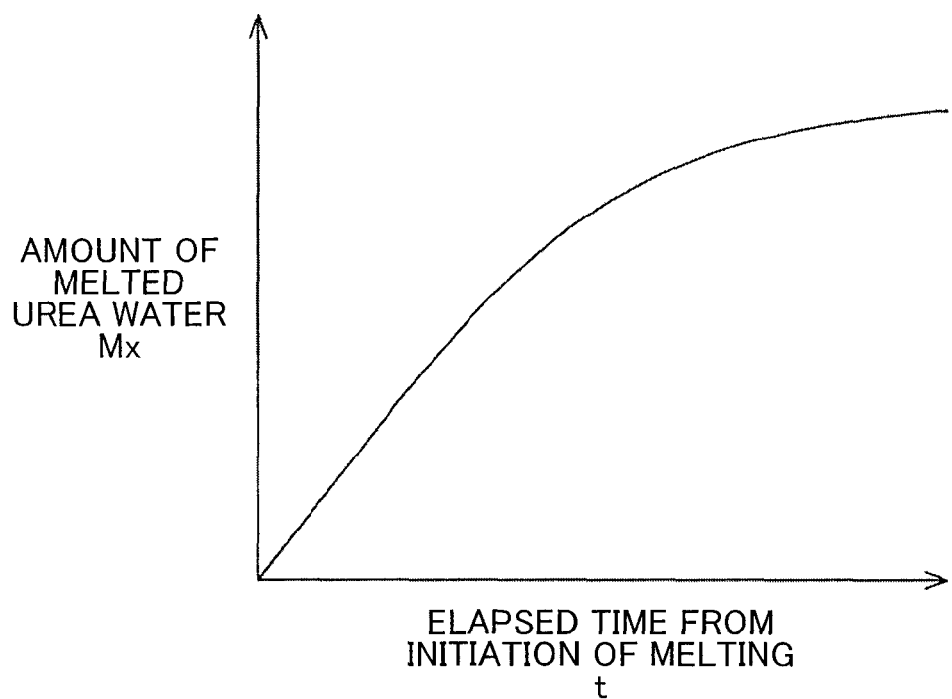
FIG. 4 shows a time chart indicating an example of progress of urea water melting amount according to an elapsed time from the beginning of freezing.

(Calculation of estimated melted amount Mx) In this embodiment, the estimated melted amount Mx is calculated with use of a function formula of an elapsed time t after the melting is initiated by heating with the heater 18, the urea water temperature Tr and an initial freezing amount V0. The initial freezing amount V0 is an amount of urea water freezing within the urea water tank 16 at an initiation time of melting. The value is obtained on the basis of a detection value of liquid level at the initiation time of melting. FIG. 4 shows an example of progress of the estimated melted amount Mx according to an elapsed time t from the beginning of freezing.

Figure 5:
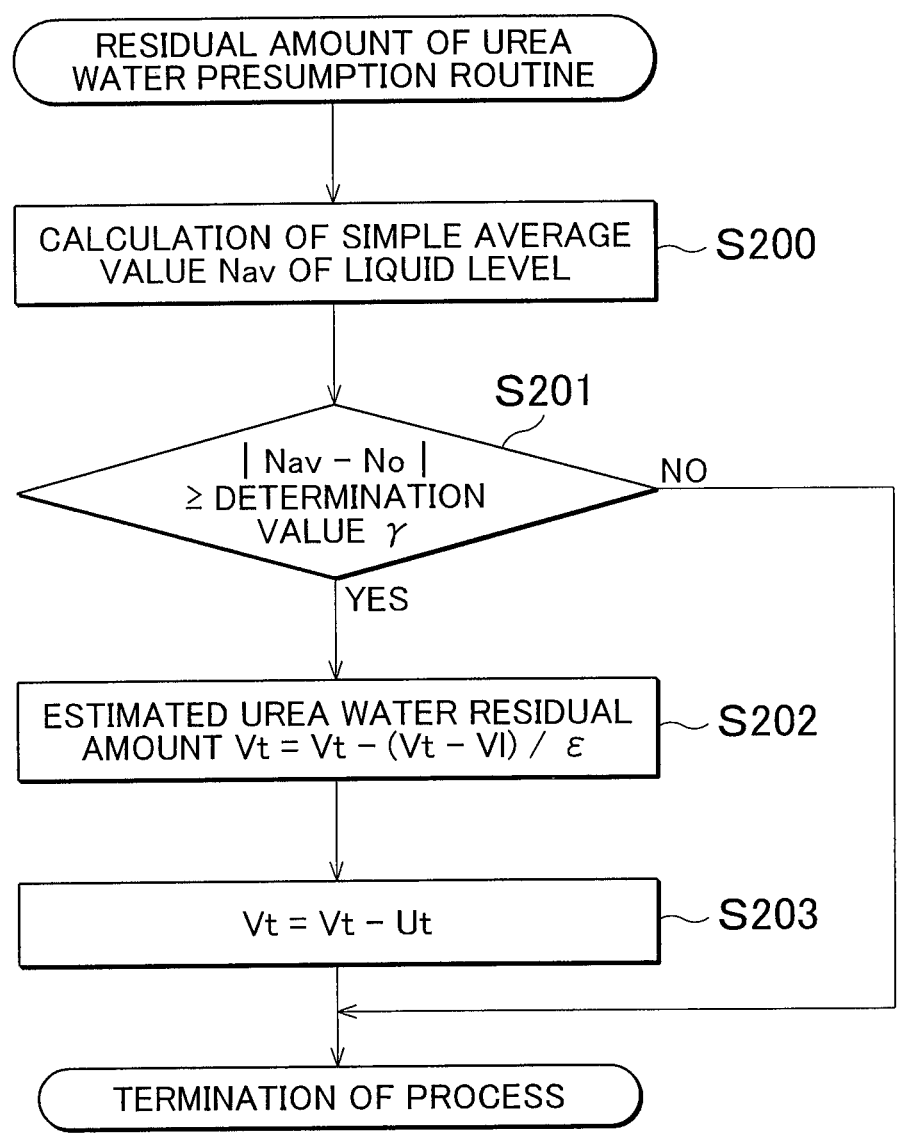
FIG. 5 shows a flowchart indicating an example of processing procedure of a residual amount of urea water presumption routine applied to the same embodiment.

(Calculation of estimated urea water residual amount Vt) FIG. 5 shows a flowchart of a residual amount of urea water presumption routine utilized for calculation of the estimated urea water residual amount Vt. The routine processing is implemented repetitively during each predetermined control period with the ECU 23.

When the routine processing initiates, a simple average value Nav of detection value of a liquid level in which urea water consumption after detection is taken into consideration, is obtained in step S200. The simple average value Nav is obtained by averaging values each of which is obtained by subtracting the urea water consumption amount after detection from the liquid level detection value of the urea water tank 16, on the basis of the following formula (1). In the following formula (1), "Ni" (i: arbitrary integer) refers to a liquid level detection value during control period at i times before. "Ui" refers to a decrease amount of the liquid level resulting from the consumption of urea water during a period from a control period at i times before to a control period at (i−1) times before, and is obtained on the basis of the consumption amount of the urea water during the same period. Besides, in the following formula (1), "n" refers to a number of the liquid level detection value utilized for the calculation of the simple average value Nay.

$$Nav=\{(N1-U1)+(N2-U1-U2)+ \ldots +(Nn+1-U1-U2- \ldots -Un-1-Un)\}/n \tag{1}$$

Subsequently, in step S201, determination is made regarding whether liquid level is stable or not, on the basis of whether the difference (|N0−Nav|) between the resultant simple average value Nav and an actual liquid level detection value N0 is a predetermined determination value γ or less. Here, when the difference is more than the determination value γ (S201: NO), the liquid level is determined to be unstable, and the processing is forwarded to step S203. Meanwhile, when the difference is the determination value γ or less (S201: YES), the liquid level is determined to be stable, and the processing is forwarded to step S203, after the estimated urea water residual amount Vt is updated according to the following formula (2) in step S202. "V1" in the following formula (2) refers to the residual amount of urea water within the urea water tank 16 estimated by actual liquid level detection value. "ϵ" refers to a predetermined constant which gradually changes.

$$Vt=Vt-(Vt-V1)/\epsilon \tag{2}$$

When the processing forwarded to the step S203, in step S203, the estimated urea water residual amount Vt is updated to be a value, which is obtained by subtracting the consumption amount Ut of urea water during a period from the former control period to the actual control period from preceding estimated urea water residual amount Vt. Then, the routine processing is terminated. Namely, in this embodiment, the estimated urea water residual amount Vt is obtained by subtracting the consumption amount of urea water resulting from addition of exhaust gas, with reference to the residual amount of urea water within the urea water tank 16 with the liquid level being stable.

(Calculation of supplied amount Vx) The suppliable amount Vx is obtained on the basis of the following formula (3). In the following formula, "V0" refers to the abovementioned initial freezing amount, and "V" refers to a full capacity of the urea water tank 16. "U" refers to a consumption amount of urea water during a period from the time of confirming the freezing of urea water, namely confirmation of decrease in the urea water temperature Tr down to the freezing temperature of urea water or less to the time of confirming air vacuuming.

$$Vx=V-V0+U \tag{3}$$

Next, action of this embodiment according to the above configuration will be explained.

In the exhaust gas control system according to this embodiment, notification for prompting the supply of urea water is made only by lighting of the urea water supply indicator 25, when the amount of urea water within the urea water tank 16 actually decreases. As described above, the manual instructs to supply urea water within the urea water tank 16 in an amount required for driving vehicle at a predetermined distance, or more, in this condition.

Meanwhile, notification for prompting the supply of urea water is made by the lighting of the urea water supply indicator 25 and the display of the suppliable amount Vx of the suppliable amount indicator 27, when urea water is left within the urea water tank 16 while the urea water is frozen and not pumped out. As described above, the manual instructs to supply urea water within the urea water tank 16 in the suppliable amount Vx displayed in the suppliable amount indicator 27, in this condition.

According to this embodiment, the notification for prompting the supply of urea water is made in different aspects, between the case that the residual amount of urea water within the urea water tank 16 is actually decreased, and the case that urea water is left within the urea water tank 16 but not pumped out due to freezing. Besides, in the latter case, the notification for prompting the supply of urea water is made by the display of the suppliable amount Vx, which is the estimated value of the actual amount of urea water suppliable to the urea water tank 16.

The exhaust gas control system of internal combustion engine according to this embodiment brings the following advantageous effects: (1) In this embodiment, when urea water is left within the urea water tank 16 but not pumped out due to freezing, the suppliable amount Vx is displayed with the suppliable amount indicator 27, while the urea water supply indicator 25 is lighted. Thereby, it is possible to supply an adequate amount of urea water so as not to cause overflow from the urea water tank 16 even when the frozen urea water is left. When urea water is supplied, it is possible to restart the addition of urea water in exhaust gas, and easily transmit the heat to the frozen urea water from the heater 18 through the medium of the supplied urea water so as to facilitate the melting of urea water. Accordingly, according to this embodiment, it is possible to suppress the stop of the urea water addition resulting from freezing more preferably.

(2) This embodiment allows to estimate an actual suppliable amount of urea water within the urea water tank 16, and to give the notification for prompting the supply of urea water as well as information indicating the estimated suppliable amount when the frozen urea water is left. Thereby, it is possible to precisely order of the amount of urea water to be supplied within the urea water tank 16 with the frozen urea water being left.

In the above embodiment, it is possible to modify for implementation as follows. In the above embodiment, the suppliable amount Vx is calculated on the basis of the initial freezing amount V0 and the consumption amount U of urea water in a period until the air vacuuming occurs after the urea water freezes, but may be calculated in a different method. For example, it is possible to confirm the liquid level of the urea water tank 16 when the freezing of urea water is confirmed, and to calculate the suppliable amount Vx on the basis of a volume of upper portion above the liquid level in the urea water tank 16. Besides, it is possible to modify calculation method of the estimated melted amount Mx and the estimated urea water residual amount Vt, as appropriate.

In the above embodiment, the notification for prompting the supply of urea water is made in response to the lighting of the urea water supply indicator 25; and the notification of the information indicating the suppliable amount of urea water is made on the basis of the numeral display in the suppliable amount indicator 27. These notifications may be made in other aspects. For example, it is possible to perform graph display of the suppliable amount Vx. In addition, these notifications may be made by displaying a character on a screen of car navigation equipped with a vehicle information display function and the like, or by sounding. In this example, the screen or the display are regarded as "a notification device".

The above embodiment allows to estimate the suppliable amount Vx, and to give the notification for prompting the supply of urea water as well as information indicating the estimated suppliable amount Vx when the frozen urea water is left. But, it may be possible to display a predetermined fixed value as the suppliable amount Vx without sequential estimation of the suppliable amount Vx. Namely, it is possible to predetermine the amount of urea water suppliable to the urea water tank 16 in which frozen urea water is left, and to display the value as the suppliable amount Vx each time, when the notification for prompting the supply of urea water is made while the frozen urea water is left. In this aspect, the predetermined amount is regarded as estimated "suppliable amount of the urea water".

The above embodiment is arranged to display the suppliable amount Vx in numeral and the like. When the notification for prompting the supply of urea water is arranged to be made in different aspects in the presence and absence of the residual frozen urea water without such a display, it is possible to more preferably suppress the stop of the addition of urea water resulting from freezing. For example, in the presence of residual frozen urea water, the notification for prompting the supply of urea water can be made by lighting an indicator different from the indicator which is lighted when the residual amount of urea water is actually decreased. Then, the manual may be arranged to instruct supply of a different amount of, urea water at the time of lighting of each indicator, enabling to notify the driver of adequate amount of supplied urea water in each condition. In this aspect, the different indicators corresponding to different suppliable amount of the urea water are regarded as "a notification device".

With the display of the suppliable amount indicator 27 and the description of manual, the above embodiment is arranged to specifically instruct the amount of urea water when supplying urea water in the presence of the residual frozen urea water. It is possible to more preferably suppress the stop of the addition of urea water resulting from freezing, with the following arrangement, without performing the instruction of specific amount. Namely, the notification for prompting the supply of urea water is arranged to be provided in different aspects in the presence and absence of the residual frozen urea water within the urea water tank 16. Then, it is possible to make a notification that urea water needs to be carefully supplied so as not to cause the overflow from the urea water tank 16 because only smaller amount can be supplied in the urea water tank 16 compared to the normal supply resulting from the decrease in the residual amount of urea water, with the display of the indicator and the description of the manual. In this aspect, the different aspects corresponding to different suppliable amount of the urea water are regarded as "a notification device".

In the above embodiment, the freezing of urea water within the urea water tank 16 is confirmed by the urea water temperature Tr. Such confirmation may be made on the basis of two or more of other temperatures correlated with a temperature environment of the urea water such as an external temperature To, an inlet air temperature of the diesel engine 10, such a temperature and the urea water temperature Tr. Accordingly, external temperature detector or inlet air temperature detector described above is regarded as "a temperature detector".

The above embodiment is arranged to confirm the air vacuuming of the urea water pump 17 by the urea water pressure Pr, but may be arranged to confirm that by other parameter such as flow amount of the urea water in the urea water pipe 21.

The above embodiment is arranged to make the notification of the supply of urea water as well as the air vacuum handling of the urea water pump 17 in the supply notification routine, but may be arranged to do those in different routines. Besides, when the air vacuum handling is not necessary, it may be arranged for processing only regarding the notification of the supply of urea water.

The above embodiment determines whether the supply of urea water is necessary, on the basis of whether the liquid level is level "LO" or not, but may be arranged to determine the same according to the decrease in the urea water pressure Pr. In addition, it may be arranged to determine that the supply of urea water is necessary, according to both the liquid level of level "LO" and the decrease in the urea water pressure Pr.

The above embodiment is arranged to determine the consumption amount of urea water by cumulating the product of the addition time and the addition rate of urea water, but may be arranged to determine the same on the basis of the flow amount of urea water in the urea water pipe 21 and the like. The above embodiment is arranged to detect the liquid level of the urea water tank 16 with the float type level sensor 20, but may be arranged to detect the same with other sensors such as resistant type, ultrasound wave type.

In the above embodiment, the heater 18 is disposed in the urea water pump 17, but may be disposed at another portion of the urea water tank 16. In addition, another heater except an electrothermic type heater, for example, a heater utilizing exhaust gas of an internal combustion engine or heat of a coolant, may be employed.

The exhaust gas control system of internal combustion engine according to the above embodiment is applied to the vehicle loaded diesel engine 10. But, similar exhaust gas control system can be applied to other internal combustion engine in the same aspect or related aspect.

The invention claimed is:

1. An exhaust gas control system of an internal combustion engine, comprising:
   a urea water tank to store urea water;
   a heater to heat frozen urea water within the urea water tank;
   a purifying device configured to purify exhaust gas by addition of the urea water pumped from the urea water tank to the exhaust gas of the internal combustion engine;
   a notification device; and
   a controller configured to (i) determine whether frozen urea water is left within the urea water tank or not;
(ii) determine, whether or not, liquid urea water capable of being pumped out is not left within the urea water tank;
(iii) estimate an amount of urea water that can be supplied into the urea water tank in response to a state where the frozen urea water is left within the urea water tank; and
(iv) control the notification device so as to give a notification for prompting a supply of the amount of urea water that can be supplied into the urea water tank in response to a state where liquid urea water capable of being pumped out is not left within the urea water tank.

2. The exhaust gas control system according to claim 1, wherein the controller is configured to control the notification device so as to indicate an information of the amount of urea water that can be supplied into the urea water tank with the notification.

3. The exhaust gas control system according to claim 1, further comprising:
a temperature detector configured to detect a temperature of the urea water, wherein the controller is configured to determine whether frozen urea water is left within the urea water tank or not, on the basis of that the temperature of the urea water is a freezing temperature of the urea water.

4. The exhaust gas control system according to claim 1, wherein the controller is configured to determine a condition that the liquid urea water capable of being pumped out is not left within the urea water tank, in response to a state where a pump to pump urea water from the urea water tank vacuums air.

5. The exhaust gas control system according to claim 1, further comprising:
a temperature detector configured to detect a temperature of the urea water,
wherein the controller is configured to control the heater so as to heat the frozen urea water at a time of detecting a freezing temperature of the urea water or lower temperature with the temperature detector, and the controller is configured to estimate the amount of urea water that can be supplied into the urea water tank on the basis of an amount of the urea water which is pumped out before the urea water is made unable to be pumped out from the urea water tank after the heater initiates heating.

6. The exhaust gas control system according to claim 1, further comprising:
a temperature detector configured to detect a temperature of the urea water,
wherein the controller is configured to control the heater so as to heat the frozen urea water at a time of detecting a freezing temperature of the urea water or lower temperature with the temperature detector, and the controller is configured to estimate the amount of urea water that can be supplied into the urea water tank on the basis of a difference between a full capacity of the urea water tank and a residual amount in the urea water tank at the time of detecting a freezing temperature of the urea water or lower temperature with the temperature detector.

7. The exhaust gas control system according to claim 1, further comprising:
a temperature detector configured to detect a temperature of the urea water,
wherein the controller is configured to control the heater so as to heat the frozen urea water at a time of detecting a freezing temperature of the urea water or lower temperature with the temperature detector, the controller is configured to calculate a first capacity in response to an amount of the urea water which is pumped out before the urea water is made unable to be pumped out from the urea water tank after the heater initiates heating, the controller is configured to calculate a second capacity in response to a difference between a full capacity and a residual amount in the urea water tank at the time of detecting a freezing temperature of the urea water or lower temperature with the temperature detector, and the controller is configured to estimate the amount of urea water that can be supplied into the urea water tank on the basis of a sum of the first capacity and the second capacity.

* * * * *